United States Patent

Grossimon et al.

[15] 3,670,180

[45] June 13, 1972

[54] INTERVALOMETER

[72] Inventors: Herbert P. Grossimon, Lexington; James O. McDonough, Concord; James K. Roberge, Lexington, all of Mass.

[73] Assignee: Concord Control Inc., Boston, Mass.

[22] Filed: Nov. 19, 1969

[21] Appl. No.: 877,893

[52] U.S. Cl. ....................307/244, 89/1.814, 307/246, 307/252 K, 307/293, 328/75, 328/106

[51] Int. Cl. ....................H03k 17/30, H03k 17/28, F41f 3/04

[58] Field of Search....................307/221 R, 221 B, 222 B, 223, 307/223 B, 224 B, 225 B, 240, 241, 242, 244, 228, 252 G, 252 H, 252 J, 252 K, 252 N, 252 Q, 284, 293; 328/35, 75, 103, 105, 106, 152, 153; 89/1.814

[56] References Cited

UNITED STATES PATENTS

| | | | |
|---|---|---|---|
| 3,504,189 | 3/1970 | McHenry | 328/75 X |
| 3,100,268 | 8/1960 | Foote | 307/252 L X |
| 3,435,257 | 3/1969 | Lawrie, Jr. | 307/289 |
| 3,058,013 | 10/1962 | Acker | 307/228 |
| 3,122,058 | 2/1964 | Wyser | 89/1.814 |
| 3,396,628 | 8/1968 | Nash | 89/1.814 |
| 3,453,496 | 7/1969 | Wright et al. | 89/1.814 X |

FOREIGN PATENTS OR APPLICATIONS

| | | | |
|---|---|---|---|
| 809,669 | 2/1959 | England | 307/215 |

OTHER PUBLICATIONS

G.E. SCR Manual, 4th Edition, p. 7 & Fig. 1.8, March 1967.

*Primary Examiner*—Donald D. Forrer
*Assistant Examiner*—L. N. Anagnos
*Attorney*—Kenway, Jenney & Hildreth

[57] ABSTRACT

A solid-state rocket firing intervalometer is disclosed which employs a plurality of SCRs (silicon controlled rectifiers) for controlling the launching of respective electrically fired rockets, the gate circuit of each SCR being responsive to an input voltage above a predetermined threshold for triggering the SCR thereby to fire the rocket. The charging of a capacitor provides a progressively rising control voltage and a voltage divider applies a different portion of the rising control voltage to each of the gate circuits. Accordingly, each rocket is fired when the respective portion of the control voltage reaches the gate circuit threshold of the respective SCR.

3 Claims, 3 Drawing Figures

INVENTORS
HERBERT P. GROSSIMON
JAMES O. McDONOUGH
BY JAMES K. ROBERGE

Kenway, Jenney & Hildreth

ATTORNEYS

INVENTORS
HERBERT P. GROSSIMON
JAMES O. McDONOUGH
BY JAMES K. ROBERGE
Kenway, Jenney & Hildreth
ATTORNEYS INVENTORS
HERBERT P. GROSSIMON
JAMES O. McDONOUGH
BY JAMES K. ROBERGE
Kenway, Jenney & Hildreth
ATTORNEYS

INTERVALOMETER

BACKGROUND OF THE INVENTION

This invention relates to intervalometers and more particularly to a solid-state intervalometer for rocket firing.

Among the armaments available for military helicopters, one of the most effective is a pod of small rockets which are suitable for use against ground targets. It is typically desirable that the rockets be fired sequentially rather than simultaneously. However, it is also desirable to provide a choice between automatic sequencing wherein the rockets are automatically fired at timed short intervals, and manual sequencing wherein each rocket is fired only upon the receipt of a respective command signal. Heretofore, sequential firing of such rockets has been provided by an electro-mechanical stepping switch, the stepping switch being operated in a self-interrupting mode to provide automatic sequencing and in a manually stepped mode to provide individual rocket firing. For the sake of reliability, it is desirable that the moving parts associated with the prior art electro-mechanical stepping switches be eliminated. However, it is also necessary that any replacement apparatus be compatible with electrical fire control circuits already installed in existing aircraft even though such circuits were designed for energizing electro-mechanical rocket firing intervalometers. It is further important that the cost of any solid-state replacement be low enough to be comparable to the cost of the relatively simple electro-mechanical stepping switch devices.

Among the several objects of the present invention may be noted the provision of a rocket firing intervalometer which employs no moving parts; the provision of such an intervalometer which is highly reliable; the provision of such an intervalometer which will provide either automatic or manually controlled sequential firing of a plurality of rockets; and the provision of such an intervalometer which is relatively simple and inexpensive. Other objects and features will be in part apparent and in part pointed out hereafter.

SUMMARY OF THE INVENTION

Briefly, apparatus according to the present invention is operative to energize a plurality of electrical loads in a predetermined sequence. The apparatus includes a plurality of semiconductor current switching devices which are connected for selectively energizing respective ones of the loads. Each device has a control terminal which responds to an input voltage above a predetermined threshold for energizing the device to energize the respective load. A progressively rising control voltage is generated and a different portion of the control voltage is applied to each of the switching device control terminals. Accordingly, each load is energized when the respective portion of the control voltage reaches the predetermined threshold. Thus, the different loads are energized in a sequence corresponding to the sequence of the different voltage portions.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
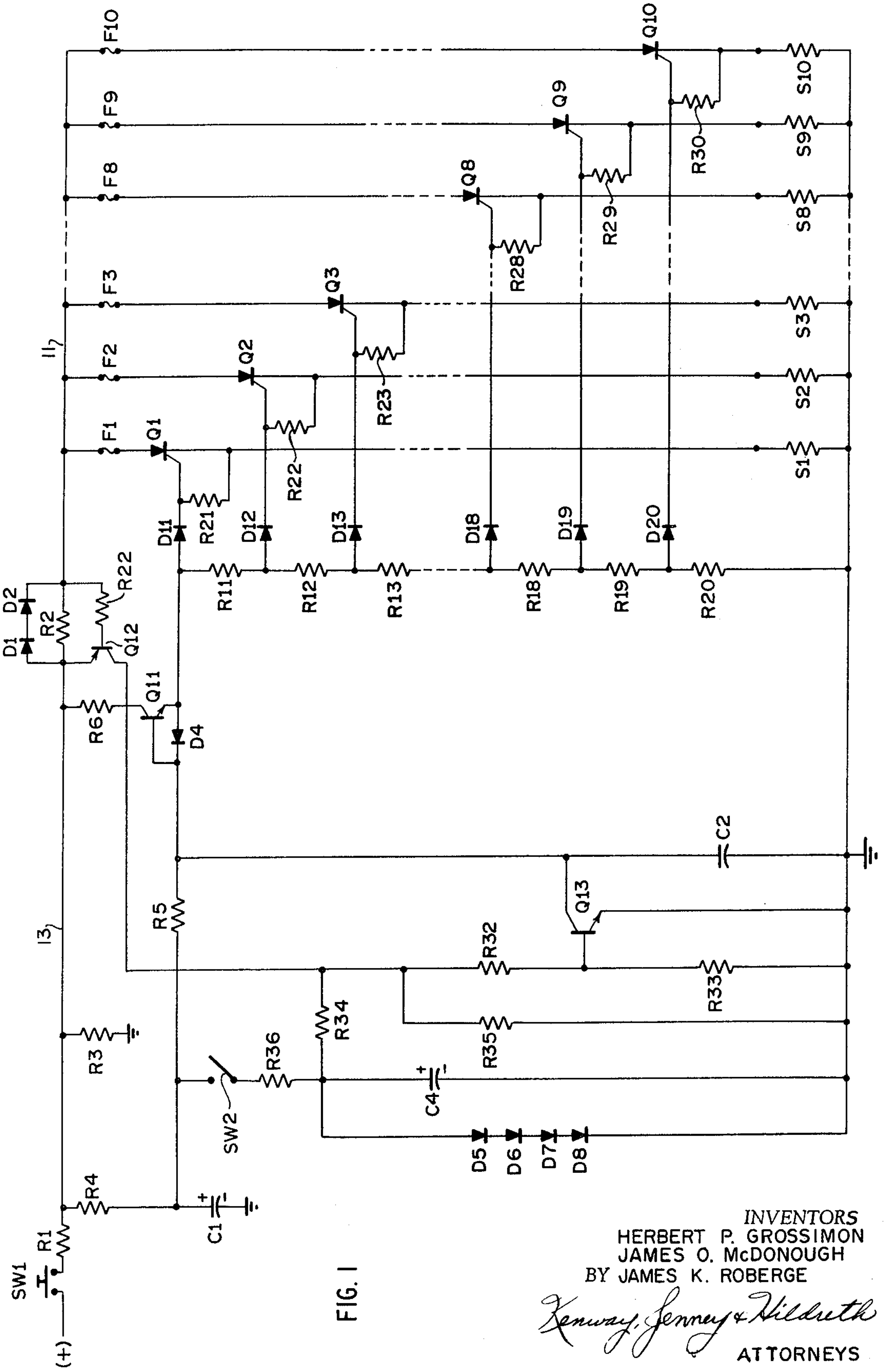
FIG. 1 is a schematic circuit diagram of a solid-state rocket firing intervalometer of this invention.

Referring now to FIG. 1, the reference characters S1–S10 indicate the resistive loads which are presented by the explosive squibs which constitute the usual means for igniting electrically fired rockets of the type commonly used for helicopter armament purposes. One side of each squib is connected to ground and the other side is connected, through a respective SCR Q1–Q10 and a respective fuse F1–F10, to a lead 11. While the intervalometer of this invention is particularly adapted for the sequential firing of rockets, it may also be used to sequentially energize other types of electrical loads.

As is understood by those familiar with conventional stepping switch type rocket firing intervalometers, the usual aircraft control circuit for providing rocket firing is merely a means of selectively providing a standard DC supply voltage through a current limiting resistance when a firing switch is closed. Such a firing switch is indicated at SW1 together with a current limiting resistor R1, a suitable positive source voltage being provided as indicated by the (+) sign. Thus, a fire control voltage is provided at a lead 13 when it is desired to commence rocket firing. As is also understood by those familiar with conventional practice, the selection between manually controlled and automatic sequential firing is typically provided by means of a switch located on the intervalometer, the selection being made before takeoff.

Lead 11 is connected to lead 13 through a resistor R2 which is of relatively low value. This resistor is shunted by a pair of diodes D1 and D2 which are operated in a forward biased mode for limiting the voltage which can be developed across resistor R2. When switch SW1 is closed, a positive supply voltage is thus provided to the anode circuits of SCRs Q1–Q10. Leads 11 and 13 are biased to ground by means of a resistor R3 when switch SW1 is open.

Current taken from lead 13 is filtered to eliminate electrical noise by means of a resistor R4 and a capacitor C1. The filtered potential thereby obtained is applied, through a resistor R5, to a capacitor C2 so as to generate a progressively rising control voltage, starting when switch SW1 is closed. The rising control voltage provided at capacitor C2 is applied, by means of an NPN transistor Q11 which is operated as an emitter follower, to a voltage divider comprising a string of resistors R11–R20. The collector of transistor Q11 is connected, through a current limiting resistor R6, to the supply lead 13. The base-emitter circuit of transistor Q11 is shunted by a diode D4 which serves to assure that the voltage across the divider drops when capacitor C2 is discharged.

The voltage divider provides, at the junctions between resistors R11–R20, various proportions of the rising control voltage and these different proportional voltages are applied, through respective diodes D11–D20, to the gate terminals of respective ones of the SCRs Q1–Q10. The gate-cathode circuit of each SCR Q1–Q10 is shunted by a resistor R21-R30 to provide a path for current to flow from the voltage dividing network through the respective diode D11–D20 and through the respective resistance loads S1–S10. The current flowing through the shunt resistor R21–R30 establishes the gate-cathode control voltage at the respective SCR Q1–Q10. Capacitors may also be connected across these gate-cathode circuits for shunting transients. The forward voltage drop across each diode D11–D20, together with the gate-cathode offset voltage of each SCR Q1–Q10, establishes a voltage threshold which must be overcome before the respective SCR is triggered into conduction. It can thus be seen that each SCR Q1–Q10 will be fired when the corresponding proportion of the total control voltage exceeds the predetermined gate firing threshold.

The voltage which is generated across resistor R2 when any one of the SCRs fires is applied, through a resistor R22, to the base-emitter circuit of a PNP transistor Q12. This transistor is thus turned on when any one of the SCRs Q1–Q10 draws current from the source. The collector of transistor Q12 is connected, by means of a voltage divider comprising a pair of resistors R32 and R33, to the base of an NPN transistor Q13. Resistors R32 and R33 are shunted by a resistor R35. Being of the opposite conductivity type, transistor Q13 is turned on when transistor Q12 conducts. The collector-emitter circuit of transistor Q13 is connected across capacitor C2 so as to discharge that capacitor when the transistors conduct. Thus transistors Q12 and Q13 comprise an amplifier which is responsive to the current drawn by any one of the SCRs for shunting the capacitor C2.

The collector of transistor Q12 is also connected, through a resistor R34, to one side of a capacitor C4, the other end of which is grounded. Capacitor C4 is thus charged when transistor Q12 conducts. The voltage which can be applied across capacitor C4 is limited by a string of diodes D5–D8 which are operated in a forward biased mode. The ungrounded side of capacitor C4 is also selectively connectable, through a resistor R36 and a switch SW2, to the filtered positive voltage provided at capacitor C1. As will be apparent hereinafter, switch SW2 is operative to provide a selection between single fire and ripple fire.

With switch SW2 in the open position as shown, the operation of this apparatus to provide ripple fire is as follows. When the fire control switch SW1 is closed, capacitor C2 charges through resistor R5. Since substantially the entire control voltage provided across capacitor C2 is applied to the gate circuit of SCR Q1, its firing threshold will be reached relatively quickly, thereby causing it to be triggered into conduction before any of the other SCRs. Conduction through SCR Q1 will fire the respective explosive squib S1 thereby launching the respective rocket. While SCR Q1 is conducting, the voltage developed across resistor R2 turns on transistor Q12 which in turn turns on transistor Q13 and discharges capacitor C2. Accordingly, the control voltage is reset substantially to its starting point. Simultaneously, capacitor C4 is charged to a predetermined voltage corresponding to the sum of the voltage drops across the diodes D5–D8.

Upon normal firing of the respective rocket, the squib S1 is effectively removed from the circuit so that no further current is drawn through SCR Q1. In the case of a misfire, the respective fusible element will blow, opening the circuit. Thus, as soon as a rocket is fired, the voltage across resistor R2 disappears and transistor Q12 is turned off. After a delay during which capacitor C4 discharges through resistors R32 and R33 and through resistor R35, transistor Q13 ceases to conduct and capacitor C2 is again permitted to charge through resistor R5. When the control voltage across capacitor C2 reaches a level such that the voltage provided at the cathode terminal of diode D12 through the voltage dividing action of the resistors and diodes connected to the gate and cathode terminals of the SCRs Q1–Q10 exceeds the triggering threshold of SCR Q2, the second rocket will be fired. Prior to the moment of launching, the current drawn by SCR Q2 through resistor R2 causes capacitor C2 to be discharged as described previously and thus the charging cycle will restart after the squib is removed from the circuit and capacitor C4 has discharged. As may be seen, each SCR will be triggered when the respective proportion of the control voltage exceeds the gate circuit threshold. Accordingly, the rockets will be launched in a sequence corresponding to the sequence of the proportions provided by the voltage divider. Preferably, the delay provided by the discharging of capacitor C4 comprises the major portion of the interval between successive rocket firings, so that this interval does not vary significantly due to the increased control voltage required to fire the later rockets in the sequence. The delay provided by the discharging of capacitor C4 can be adjusted by appropriately selecting the value of resistor R35.

In order to provide single fire mode control of the rocket firing, the switch SW2 is closed. Therefore, when the first rocket is fired and capacitor C4 is charged by transistor Q12 as described previously, current flowing through resistor R36 will keep capacitor C4 charged and will maintain the forward bias on amplifier transistor Q13 thereby preventing capacitor C2 from being recharged through resistor R5. In other words, the transistor Q13 which shunts capacitor C2 is latched into conduction and holds the voltage on capacitor C2 at the reset level. Thus, for each closing of the switch SW1, only one rocket will be fired. The value of resistor R36 is selected so that current flowing through it cannot charge capacitor C4 quickly enough to turn on transistor Q13 before the firing of the first rocket.

Figure 2:
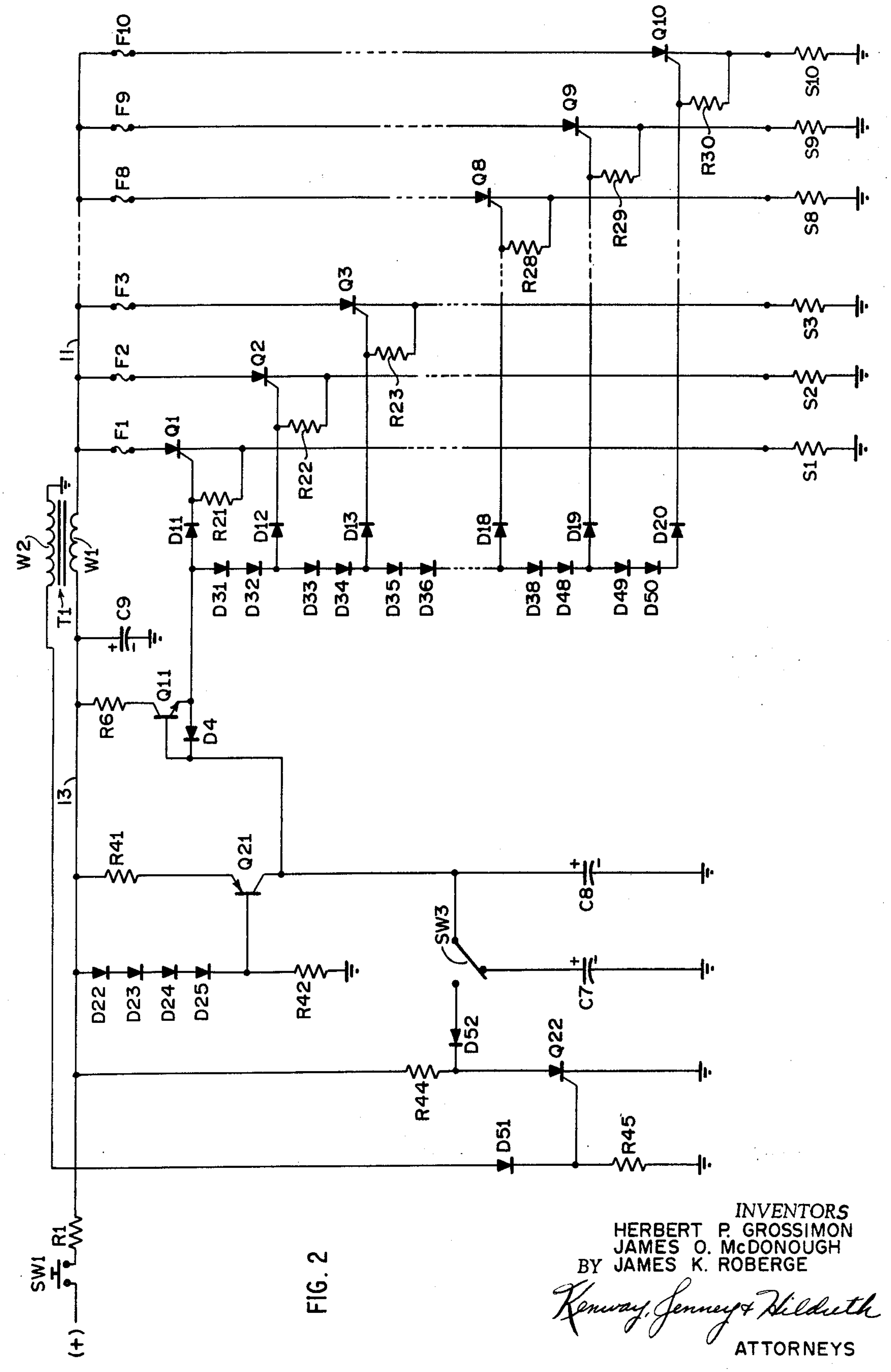
FIG. 2 is a schematic circuit diagram of another embodiment of the intervalometer.

In the embodiment of FIG. 2, the squibs S1–S10 are again selectively fired by the SCRs Q1–Q10, as in the embodiment of FIG. 1. However, in this second embodiment, the major portion of the delay between successive firings in automatic fire is determined by the rate of rise of the control voltage and, in contrast to the embodiment of FIG. 1, the control voltage is not reset between successive firings. In FIG. 2, the timing capacitance comprises a pair of capacitors C7 and C8 which, together, comprise a relatively large value of capacitance. Capacitors C7 and C8 are selectively connected together through one side of a switch SW3.

The emitter of a PNP transistor Q21 is connected to lead 13 through a current value determining resistor R41 while a preselected, substantially constant voltage is applied to its base terminal by means of a voltage divider comprising a resistor R42 and a string of forward biased diodes D22–D25. The collector of transistor Q21 is connected to capacitor C8 and, through one side of the double throw switch SW3, to capacitor C7 so that the relatively high impedance presented by the collector circuit functions as a current source for charging these capacitors. As will be understood by those skilled in the art, the voltage on capacitors C7 and C8 will thus rise substantially linearly when switch SW1 is closed.

This linearly rising voltage is applied, through the emitter follower transistor Q11, to a string of diodes D31–D50 which provide progressive voltage drops. The string thus functions substantially as a non-linear voltage divider. The diodes operate in pairs to provide successive, substantially equal voltage drops and the junctions between pairs are connected to the gate circuits of respective ones of the SCRs Q1–Q10. May be singles, pairs, etc., depending on supply voltage and diode tolerances. Accordingly, each SCR will be fired when the corresponding portion of the control voltage across the timing capacitors C7 and C8 exceeds the respective gate circuit firing threshold.

Lead 13 is bypassed to ground through a capacitor C9 and, instead of being connected thereto through a resistor, lead 11 draws current from lead 13 through the primary winding W1 of a pulse transformer T1. The secondary winding W2 of transformer T1 is connected, through a diode D51, to the gate terminal of an SCR Q22 so as to trigger SCR Q22 into conduction when a pulse current is drawn through primary winding W1 by one of the squib firing SCRs Q1–Q10.

When the switch SW3 is in the position shown, this embodiment provides automatic or ripple fire of the rockets. Upon the closing of switch SW1, the voltage on capacitors C7 and C8 rises linearly as explained previously. Accordingly, SCR Q1 is triggered into conduction as soon as the total control voltage less the voltage drop provided by diode D11, reaches the gate circuit firing threshold. Subsequently, when the control voltage, less the voltage drops provided by diode D31, D32 and D12 reaches the gate circuit firing threshold of SCR Q2, this second SCR will be fired. As is apparent, the sequence will continue, each of the SCRs Q1–Q10 being fired when the corresponding residual portion of the control voltage reaches the predetermined firing threshold. Thus the rockets will be fired automatically in a predetermined sequence corresponding to the different portions of the control voltage applied to the respective gate circuits.

When switch SW3 is operated to a position opposite that shown, capacitor C7 is removed from the timing circuit so that the control voltage will rise more quickly. Thus, when the switch SW1 is closed, the first rocket will be fired after a relatively short interval. The current drawn during the firing of this rocket causes SCR Q22 to be triggered into conduction and conduction through this SCR discharges or reset capacitor C8 preventing any further SCRs from being triggered. As it is a characteristic of the SCR type of current switching device to latch into its conductive state, capacitor C8 will be maintained in its discharged or reset condition so long as switch SW1 is held closed. SCR Q22 will, however, be released from its conducting state when switch SW1 is released. Accordingly, it can be seen that only one rocket will be fired for each closing of switch SW1 when switch SW3 is the position opposite that shown.

Figure 3:
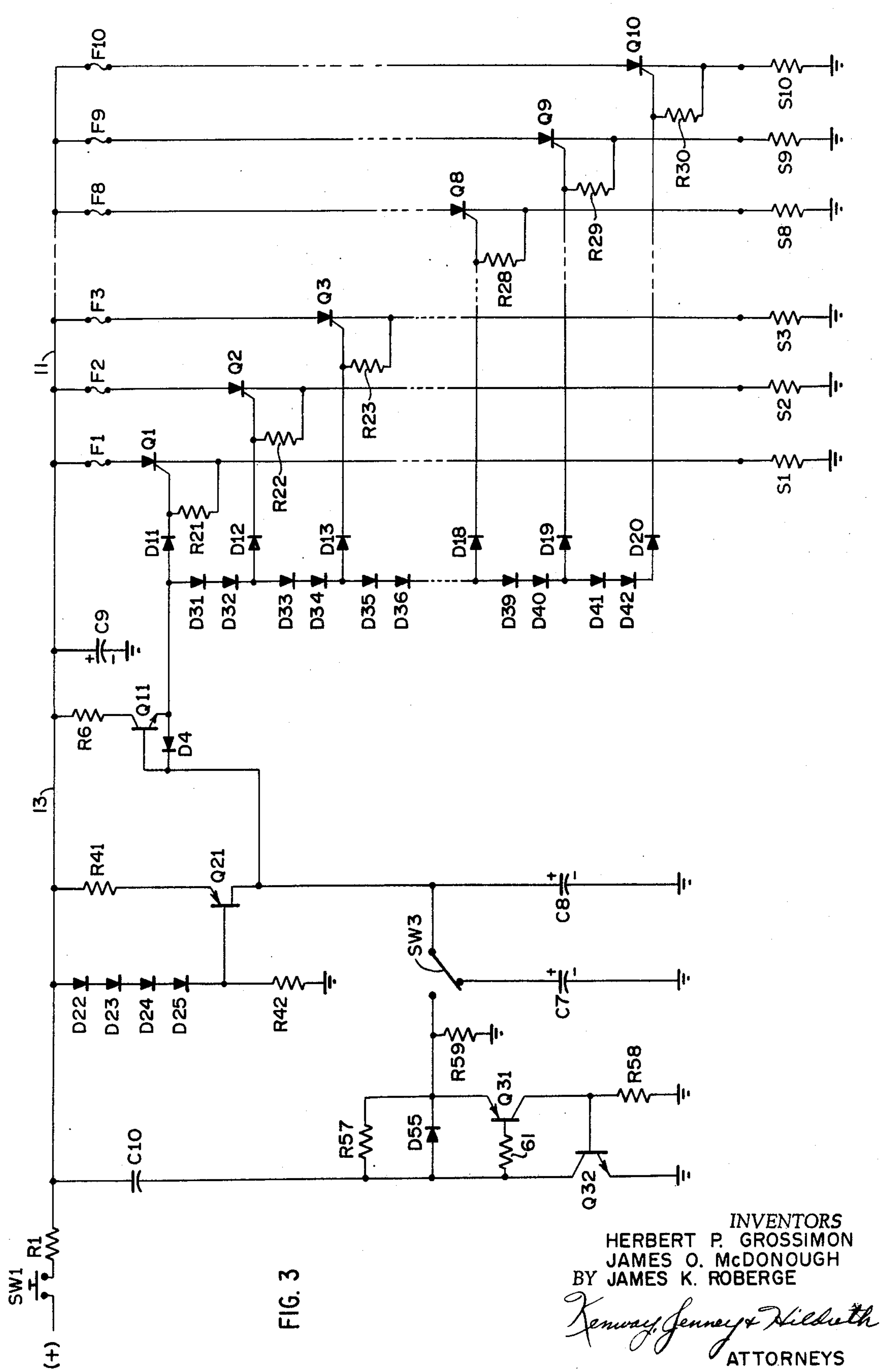
FIG. 3 is a schematic circuit diagram of a third embodiment.

The embodiment of FIG. 3 employs the linear charging circuit and diode voltage dropping string of the embodiment of FIG. 2 but, in this third embodiment, the current drawn upon the triggering of any one of the squib firing SCRs Q1–Q10 is sensed by means of the resulting voltage pulse generated across resistor R1. This pulse is coupled, through a capacitor C10, to a latching circuit comprising a pair of transistors Q31 and Q32. Transistors Q31 and Q32 are of complementary conductivity types, the transistor Q31 being of the PNP type and the transistor Q32 being of the NPN type. The collector of transistor Q31 is connected directly to the base of transistor Q32 and the collector of transistor Q32 is connected, through a resistor R61, to the base of transistor Q31. Transistor Q31 is normally biased off by means of resistor R57 and transistor Q32 is normally biased off by means of resistor R58. Reverse biasing of the base-emitter circuit of transistor Q31 is limited by a diode D55. When the switch SW3 is in the position shown, the emitter of transistor Q31 is normally biased to ground through a resistor R59. As is understood by those skilled in the art, the collector to base interconnection of the transistors Q31 and Q32 is a regenerative configuration in which both transistors will latch into a conducting state once conduction is initiated.

When the switch SW3 is in the position shown, the circuit of FIG. 3 provides automatically sequenced firing of the rockets in the same manner as the embodiment of FIG. 2. When the switch SW3 in its opposite position, however, the firing of the first SCR generates a pulse across resistor R1 which triggers transistors Q31 and Q32 into conduction, thereby discharging capacitor C8. Since the transistors Q31 and Q32 are interconnected in a regenerative circuit which latches into conduction, capacitor C8 is maintained in its discharged or reset condition as long as switch SW1 is closed. The regenerative circuit will, however, reset itself when the source current is shut off. Thus, it can be seen that, when the switch SW3 is in the position opposite that shown, only one rocket will be fired for each closure of the switch SW1.

In all of the embodiments illustrated, the sequencing of the rockets, that is, the determination of their order of firing, is established by a progressively rising control voltage even though in one embodiment the control voltage is reset between firings and in the other embodiments it is not. Since only solid state components are employed in the intervalometers shown in FIGS. 1–3, it will be understood that highly reliable operation is provided. Further, these circuits can be constructed relatively inexpensively and can be made in very compact form.

In view of the above, it will be seen that several objects of the invention are achieved and other advantageous results are attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for launching a plurality of electrically fired rockets in a predetermined sequence, said apparatus comprising:

a plurality of triggerable semiconductor current switching devices connected for selectively firing respective ones of said rockets, each device having a control terminal which is responsive to an input voltage above a predetermined threshold applied thereto for triggering the respective device to fire the respective rocket;

a capacitor;

means for charging said capacitor thereby to generate a progressively rising control voltage; and a resistive voltage divider for applying a different proportion of said control voltage to each of said control terminals;

means for sensing the current drawn by said semiconductor switching devices in firing respective rockets and for generating a signal when each rocket is fired; and means responsive to said signal for discharging said capacitor and for providing a predetermined delay after said current ceases before permitting said capacitor to resume charging whereby the different rockets are launched in a sequence corresponding to the sequence of the different portions.

2. Apparatus as set forth in claim 1 wherein said means for discharging said capacitor includes a transistor amplifying means which is biased into conduction in response to current drawn by said switching devices.

3. Apparatus for launching a plurality of electrically fired rockets in a predetermined sequence, said apparatus comprising:

a plurality of triggerable semiconductor current switching devices connected for selectively firing respective ones of said rockets, each device having a control terminal which is responsive to an input voltage above a predetermined threshold applied thereto for triggering the respective device to fire the respective rocket;

a capacitor;

means for charging said capacitor thereby to generate a progressively rising control voltage; and a resistive voltage divider for applying a different proportion of said control voltage to each of said control terminals; and means including transistor amplifying means biased into conduction in response to the current drawn by any one of said switching devices in firing the respective rocket for discharging said capacitor and including also a second capacitor which maintains conduction through said transistor amplifying means to provide a predetermined delay after said current ceases before permitting said capacitor to resume charging whereby the different rockets are launched in a sequence corresponding to the sequence of the different portions.

* * * * *